A. PATRICK.
MODE OF UNLOADING COAL AND OTHER CARS.
No. 11,530. Patented Aug. 15, 1854.
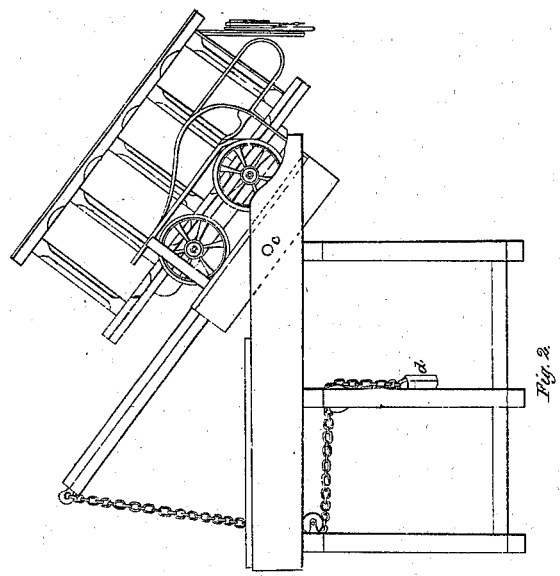
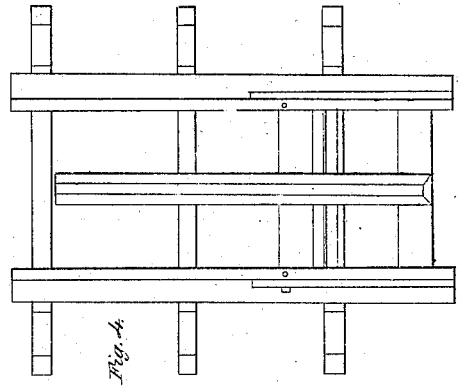
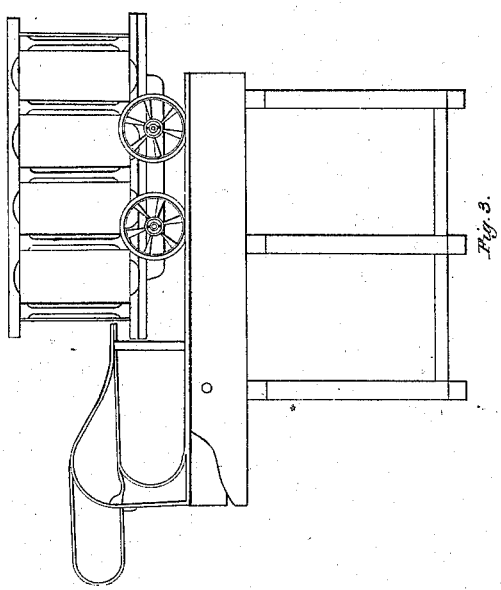
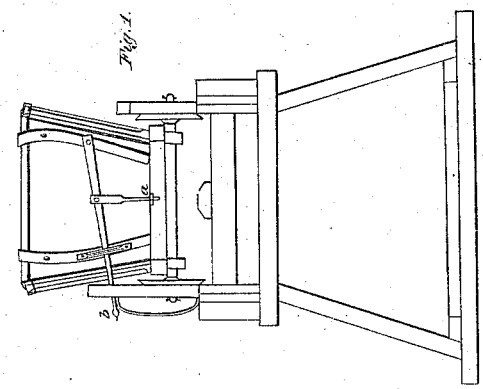

UNITED STATES PATENT OFFICE.

ANDREW PATRICK, OF ALLEGANY COUNTY, MARYLAND.

MODE OF UNLOADING COAL AND OTHER CARS.

Specification of Letters Patent No. 11,530, dated August 15, 1854.

*To all whom it may concern:*

Be it known that I, ANDREW PATRICK, of Allegany county and State of Maryland, have invented a new and Improved Method of Unloading Cars Used in Mining Coal and other Materials; and I do hereby declare that the following is a full and exact description thereof, reference being had to the accompanying drawings and to letters of reference marked thereon.

The nature of my invention consists in the manner of liberating a door hung upon hinges at one end of a car so that the car may discharge its load thereby; and also in the arrangement of a portion of the track upon which the car stands, so that the car may be tilted and the door opened to discharge the load at the same instant.

The door at the end of the car is hung at the top with hinges and fastened at the bottom by a pin or bolt as at *a* Figure 1, in the accompanying drawing; which pin is lifted by the lever connected with it when said lever passes over an iron bow forming part of the tilting frame as at *b*, Fig. 1. This tilting frame is so formed that the loaded car entering upon it is tilted at once and the load discharged; the iron bow above alluded to, forming also a hook which is part of the track and which clasping the front wheels of the car, prevents the car from completely overturning and leaving the track, as shown in Fig. 2, of the accompanying drawing.

The tilting frame which forms a portion of the track is hung upon a hinge or axle as shown at *c* Fig. 2 and has attached to it an adjusting weight as at *d* Fig. 2, which restores the car to its level position after the load has been discharged.

Fig. 3 is a side view of the tilting frame and the car in a level position.

Fig. 4 is a horizontal view of the track and tilting frame.

What I claim as my invention and desire to secure by Letters Patent, is—

1. The manner of liberating the pin, which holds the door of the car, by a lever attached to said pin calculated to lift it and open the door when the car enters upon a tilting frame.

2. Also I claim as my invention the iron bar upon a tilting frame forming a hook to hold the car, and at the same time a means of lifting the lever to open the door of the car:—or in other words the combination of this lever and tilting frame to facilitate the unloading of mine cars.

ANDREW PATRICK.

Witnesses:
 F. B. TOWER,
 EDWARD C. TILLSON.